US006022834A

United States Patent [19]

Hsu et al.

[11] Patent Number: 6,022,834

[45] Date of Patent: Feb. 8, 2000

[54] ALKALINE SURFACTANT POLYMER FLOODING COMPOSITION AND PROCESS

[75] Inventors: Oliver YeSung Hsu; Nelson SungNan Hsu, both of Sugarland, Tex.

[73] Assignee: Oil Chem Technologies, Inc., Sugarland, Tex.

[21] Appl. No.: 08/833,348

[22] Filed: Apr. 4, 1997

Related U.S. Application Data

[63] Continuation-in-part of application No. 08/653,385, May 24, 1996, abandoned.

[51] Int. Cl.[7] .......... E21B 43/16

[52] U.S. Cl. .......... 507/259; 507/255; 507/261; 507/264; 507/266; 507/935; 507/936; 507/937; 166/268; 166/275

[58] Field of Search .......... 507/259, 255, 507/266, 264, 261, 203, 935; 166/936, 937, 268, 275

[56] References Cited

U.S. PATENT DOCUMENTS

| | | | |
|---|---|---|---|
| 3,348,611 | 10/1967 | Reisberg et al. | 166/275 |
| 3,520,366 | 7/1970 | Jones | 166/270.1 |
| 3,882,938 | 5/1975 | Bernard | 166/270 |
| 4,856,589 | 8/1989 | Kuhlman et al. | 166/273 |
| 5,000,262 | 3/1991 | Danzik | 166/272.3 |
| 5,068,043 | 11/1991 | Thigpen et al. | 252/855.4 |

*Primary Examiner*—Shean C. Wu
*Attorney, Agent, or Firm*—Michael B. Jolly

[57] ABSTRACT

An improved concentrated surfactant formulation and process for the recovery of residual oil from subterranean petroleum reservoirs, and more particularly an improved alkali surfactant flooding process which results in ultra-low interfacial tensions between the injected material and the residual oil, wherein the concentrated surfactant formulation is supplied at a concentration above, at, or, below its CMC, also providing in situ formation of surface active material formed from the reaction of naturally occurring organic acidic components with the injected alkali material which serves to increase the efficiency of oil recovery.

26 Claims, 3 Drawing Sheets

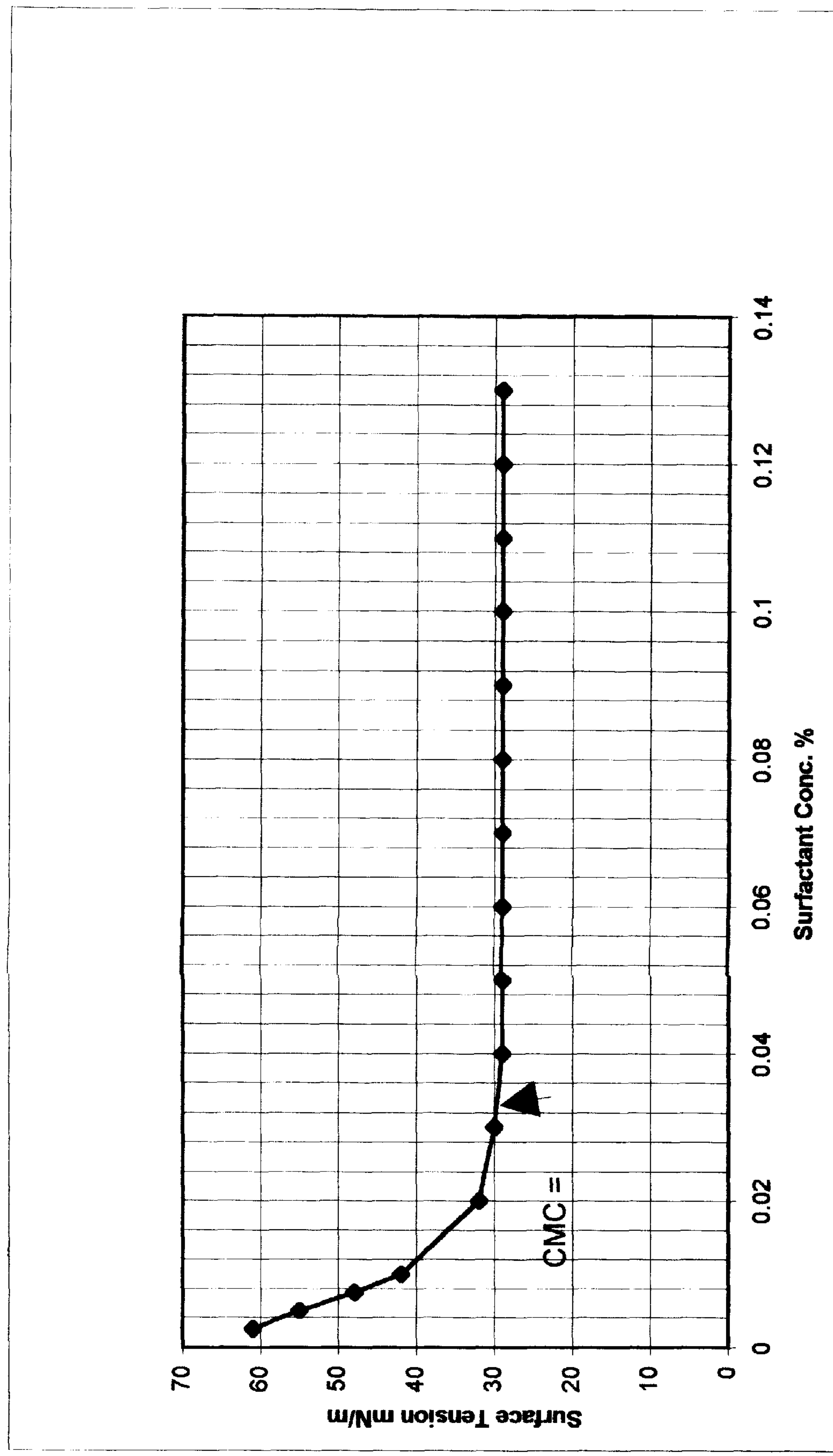
FIGURE 1 CMC of SURFACTANT

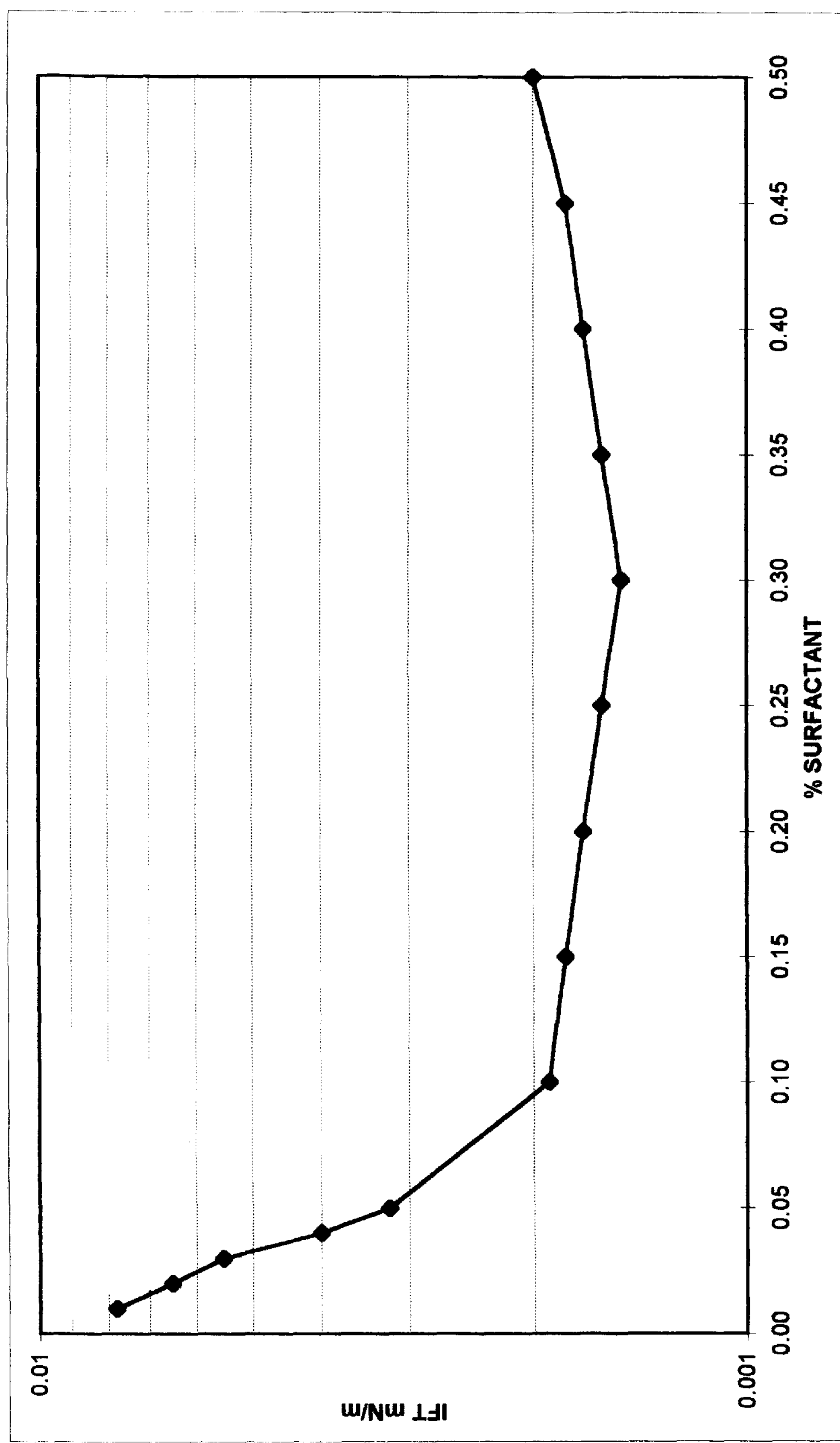
FIGURE 2 EFFECT OF SURFACTANT CONCENTRATION ON IFT
Note: IFT = >>1 mN/m where Surfactant Concentration = 0%
Brine = See Table 2 Temp = 45° C NaOH = 1.0%

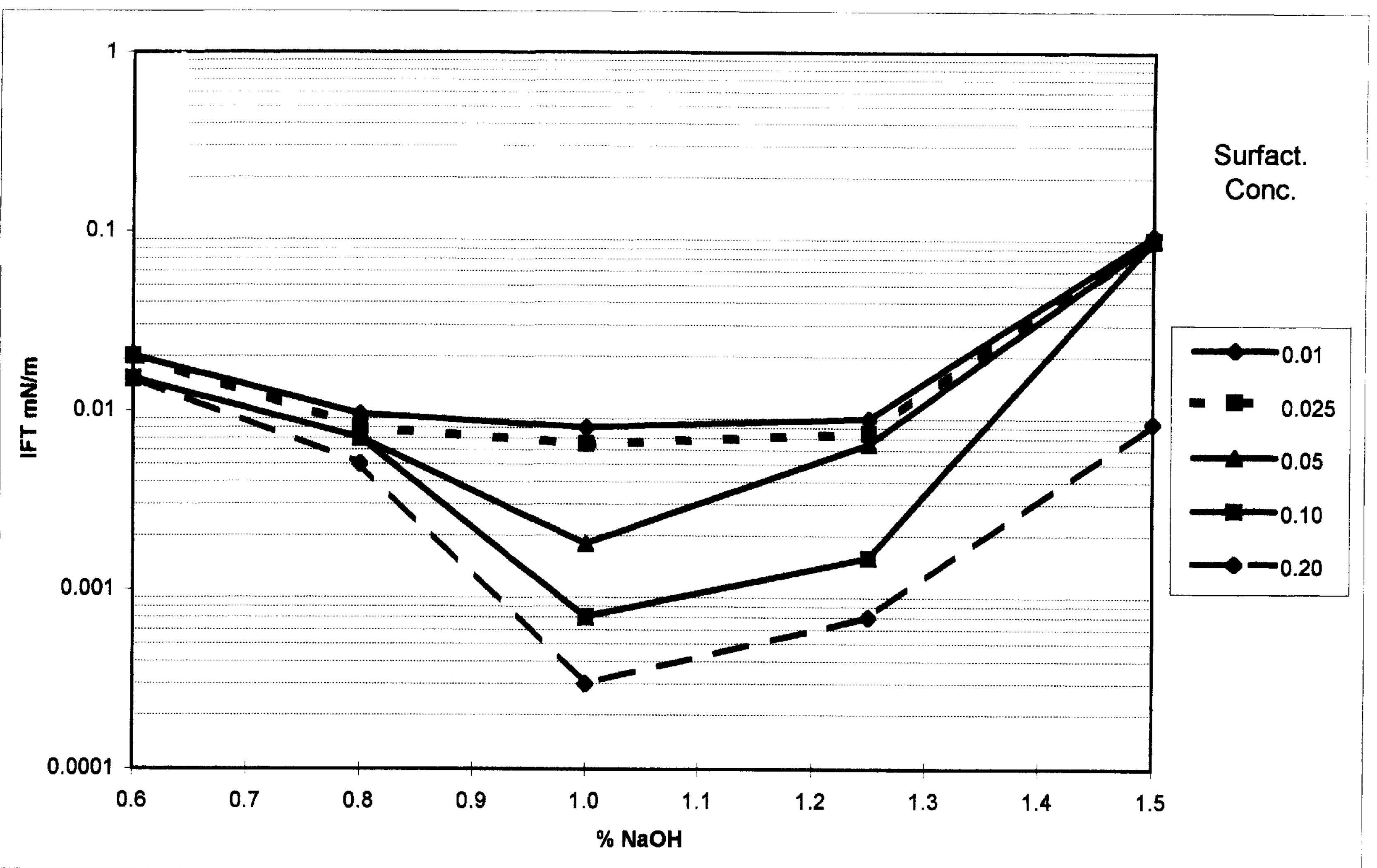
FIGURE 3 EFFECT OF NaOH & SURFACTANT CONCENTRATION ON IFT
Brine = See Table 2 Temp = 45° C Test Crude Oil

ALKALINE SURFACTANT POLYMER FLOODING COMPOSITION AND PROCESS

RELATED APPLICATIONS

The present application is a continuation-in-part of U.S. patent application Ser. No. 08/653,385 filed May 24, 1996, this application is abandoned.

BACKGROUND OF THE INVENTION

1. Field of the Invention

The present invention relates to the recovery of oil from subterranean petroleum reservoirs, and more particularly, to an improved surfactant flooding process and composition applicable to alkaline surfactant flooding (ASF) and alkaline surfactant polymer flooding (ASPF) which results in ultra-low interfacial tensions with brine against crude oil even while the surfactant present is at or below its critical micelle concentration (CMC). The alkaline surfactant flooding process is used in oil reservoirs where a primary surfactant system has been diluted with brine and pumped downhole where the alkali, which is usually sodium hydroxide or sodium carbonate, reacts with the residual oil acidic organic component(s) to form a secondary surfactant system. This "in situ" formed secondary surfactant helps the primary surfactant further reduce the interfacial tension between the residual oil and the injected fluid thereby allowing the removal of residual oil from the pores of the reservoir. The present invention utilizes a primary surfactant system which includes anionic surfactant(s), nonionic cosurfactant(s), solvent(s), and strong base.

Ultra-low Interfacial Tension Measurements ($<10^{-2}$ mN/m) are obtained between the diluted primary injection solution and the residual oil allowing the primary injection solution to permeate the reservoir oil thereby allowing maximum contact between the alkali and the acidic organic component (s) of the residual oil even though concentrations of the surfactants in the diluted primary system may fall to levels at or below the CMC.

2. The Prior Art

It is well known that substantial amounts of oil remain in subterranean petroleum reservoirs after primary and secondary recovery processes have been employed. Numerous tertiary means of recovering residual oil have been developed, such as adding various chemicals to an aqueous reservoir flooding medium. These processes have provided improved tertiary oil recovery in selected oil fields with suitable chemical and physical parameters.

The prior advances have not supplied an aqueous surfactant system and process which performs well at low surfactant concentrations, or surfactant concentrations at or below its CMC. Additionally, the surfactant used by the prior advances has been found to interfere with the ability of the polymer to increase the viscosity, the surfactant used is rapidly lost through absorption onto the formation, the range of surfactant concentrations where the interfacial tension of the surfactant is ultra-low ($<10^{-2}$ mN/m) is too narrow, the temperature range of the surfactant where the interfacial tension is ultra-low ($<10^{-2}$ mN/m) is too narrow, the range of alkalinity where the interfacial tension of the surfactant is ultra-low ($<10^{-2}$ mN/m) is too narrow, the surfactant is not readily soluble or dispersible in the formation brine, the viscosity of the concentrated surfactants is very high making it difficult to handle during transfer and dilution.

The uniqueness of the present invention is that a surfactant formulation has been found which when combined with a solution containing alkali and optionally a polymer allows the alkali to enter the pores of an oil bearing formation by lowering the interfacial tension between the oil and injection solution resulting in intimate contact between the alkali and the residual oil containing acidic organic component(s). This further allows the formation of a secondary surfactant which is formed in situ by the reaction of the injected alkali and the residual oil containing acidic organic component(s). The invention is stable in solutions of the alkali, does not degrade or interfere with the performance of the polymer, and is effective at low concentrations at or below the CMC, and works over a wide range of alkali concentrations. It is very important that the surfactant system work over a broad range of alkali concentrations because the concentration of the alkali and surfactant changes as the alkali is depleted by reactions with residual oil containing acidic organic component(s), and as the alkali and surfactant is diluted with formation brine or adsorbed onto the formation. The surfactant system must be able to function effectively during the concentration changes encountered. Accordingly the inventors have found that these problems and others have been overcome by carefully selecting the optimum mixture of surfactants, solvent(s) and co-surfactant(s), such surfactants being the various products of the sulfonation of alkylaromatics.

SUMMARY OF THE INVENTION

It is accordingly the object of the invention to provide an improved concentrated surfactant formulation containing primarily a mixture of anionic surfactants which demonstrate ultra-low ($<10^{-2}$ mN/m) interfacial tension against crude oils containing acidic organic components over a broad range of surfactant concentrations, electrolyte concentrations, alkali concentrations, temperatures, and furthermore the surfactant(s) being dispersible in formation brine and used at a concentration above, at, or below its CMC.

It is a further object of the present invention to provide an improved alkaline surfactant flooding technique wherein the injection fluid comprises the aforementioned concentrated surfactant formulation containing a mixture of anionic surfactants and more particularly the anionic surfactants being formed from the sulfonates of linear and branched dodecyl, tridecyl, tetradecyl, pentadecyl, hexadecyl, and higher chain length alkyl benzenes, and the sulfonates of alkyl naphthalenes, toluene, xylene, and the sulfonatable fraction of oils known as petroleum sulfonates and their metal and amine salts.

It is a further object of the present invention to provide an improved alkaline surfactant flooding process wherein the injection fluid contains the above mentioned concentrated surfactant formulation containing a mixture of anionic surfactants which when added to alkaline brine give ultra-low ($<10^{-2}$ mN/m) interfacial tension against a crude oil, and which concentrated surfactant formulation may further comprise solvent(s) and nonionic cosurfactant(s) which enhance the ultra-low ($<10^{-2}$ mN/m) interfacial tension in the injected fluid.

It is a further object of the present invention to provide a method of recovering residual oil found in subterranean oil reservoirs by utilizing the aforementioned improved alkaline surfactant flooding process, where an aqueous polymer may also be used to increase the viscosity of the injection fluid containing an alkali and the concentrated surfactant formulation, either above, at, or below its CMC, which decreases the interfacial tension between the trapped oil and the injection fluid to $<10^{-2}$ mN/m allowing the alkali to come in contact with the trapped oil and react with naturally occurring acidic organic component(s) present in the residual oil forming salts having surfactant properties which enable the residual oil to be emulsified or dispersed in the aqueous phase and thus mobilized and brought to the surface.

BRIEF DESCRIPTION OF THE TABLES

Table 1 Gives examples of formulations used in the development of the invention

Table 2 Shows the composition of the brine used in the testing.

Table 3 Illustrates a comparison of the interfacial tensions of 0.3% by weight solutions of the surfactant formulation, whose composition is within the scope of this invention, with various concentrations of NaOH, using a University of Texas spinning drop tensiometer and further using a test crude oil and brine whose composition is described in Table 2.

BRIEF DESCRIPTION OF THE DRAWINGS

FIG. 1 Illustrates the determination of the CMC of the concentrated surfactant formulation according to this invention.

FIG. 2 Illustrates the interfacial tensions for various dilutions of the concentrated surfactant formulation below, at, and above its CMC in the brine described in Table 2 against the test crude oil.

FIG. 3 Illustrates the interfacial tensions of the concentrated surfactant formulation, according to this invention, at concentrations between 0.01 and 0.2% and NaOH concentrations between 0.60 and 1.5% by weight in the brine described in Table 2 against the test crude oil.

DESCRIPTION OF THE INVENTION

While the present invention will be fully described it is to be understood at the outset that persons skilled in the art may modify the invention herein described while still achieving the desired result of the invention. Accordingly, the description which follows is to be understood as a broad informative disclosure directed to persons of skill in the appropriate arts and not as limitations upon the present invention.

The present invention utilizes a primary concentrated surfactant system containing (1) a mixture of anionic surfactants, (2) solvent(s), (3) a strong base and (4) optionally a nonionic surfactant or mixture of nonionic surfactants or the sulfate or carboxylate of these nonionic surfactants.

The primary surfactant system must provide, preferable, ultra-low interfacial tensions in the range of $10^{-3}$ mN/m in the presence of a broad range of alkali and electrolyte concentrations. The surfactant(s) included in the primary surfactant system is selected from a group of sulfonates derived from linear and branched alkyl benzene, alkyl naphthalenes, alkyl toluene, or alkyl xylene, either alone or in combination in varying concentration where the alkyl group consist of between about C-4 and about C-24 and the resulting sulfonate has an average molecular weight of about 230 and about 600. The sulfonation of the alkylaromatic compounds is carried out by one of the many methods known to the art such as the use of oleum, cold $SO_3/SO_2$, chlorosulfonic acid or sulfur trioxide. It has been found that a blend of the sodium salts of the acids resulting from the sulfonation of branched and linear alkylbenzene or mixtures of branched alkylbenzene, where the alkyl chain ranges from about C-4 to about C-24 gives ultra-low interfacial tension as opposed to using only the linear alkylbenzene, see Table 1. Additionally, the resulting molecular weight has been found to be critical in order to obtain ultra-low interfacial tension and the preferred molecular weight has been found to vary depending on the crude oil of interest. The blend of sulfonated alkyl surfactants are chosen so that they deliver the optimum ultra-low interfacial tension between an alkaline brine and the crude oil of interest. The amount of the alkylaromatic sulfonic acid in the concentrated mixture can range from 40 to about 60 percent by weight while the preferred amount is about 50 percent in the concentrated solution. The alkylaromatic sulfonic acid is neutralized with a strong base, preferable sodium hydroxide, to bring the final pH of the concentrated surfactant to above 7.

In addition to providing ultra-low interfacial tensions over a broad range of alkali concentrations, the inventors have found that the selected sulfonate blend also provides ultra-low interfacial tensions at very tow surfactant concentrations. FIG. 1 illustrates the CMC of the sulfonate blend, identified as Example 3 in Table 1, to be about 0.036%. FIG. 2 illustrates ultra-low interfacial tension measurements when the concentration of Example 3 of Table 1 is below, at, and above its CMC. Further, FIG. 3 illustrates ultra-low interfacial tension measurements using various concentrations of the surfactant system, described as Example 3 of Table 1, while also varying the NaOH concentrations between 0.60 and 1.50% by weight. From data such as this, the inventors have found that the surfactant systems of this invention provide ultra-low interfacial tensions below, at and above its CMC which provides significant cost saving over existing surfactant systems.

The nonionic surfactant selected as a co-surfactant must exhibit a wide range of low and stable interfacial tensions between the alkaline brine and the crude oil in question. Examples of nonionic surfactants suitable include any number of nonionics, including alkoxylated nonylphenol, alkoxylated dinonylphenol, alkoxylated octylphenol and alkoxylates of various straight and branched alcohols having a carbon chain length of preferably from 8 to about 20 or more carbon atoms. Carboxylated and sulfated derivatives of these nonionics have also been found useful in extending the useful range of low interfacial tensions. The preferred group of nonionic surfactants are nonylphenol ethoxylates having from 2 to 12 moles of ethylene oxide. Table 3, Example 4, shows data obtained using nonylphenol+6EO blended with sulfonated alkylbenzene derived from a mixture of linear and branched alkyl groups. This combination is shown to provide ultra-low interfacial tensions over a broad range of alkali concentration. The amount of the nonionic in the concentrated mixture can range from 0 to about 10 percent by weight and the most preferred concentration was found to be about 3 percent of the concentrated mixture.

Solvents may be formulated with the concentrated surfactant solution. Isopropyl alcohol, ethylene glycol, water and a narrow-cut aromatic solvent such as Exxon's AROMATIC-100™ are the preferred solvents. The concentration of the narrow-cut aromatic solvent ranges from about 0 to about 10 percent by weight with a preferred amount of about 5 percent. Other lower carbon chain alcohols could also be utilized in the place of isopropyl alcohol consisting of alkyl alcohols from about 2 to about 8 carbon atoms such as ethanol, n-propyl alcohol, n-butyl alcohol, sec-butyl alcohol, n-amyl alcohol, sec-amyl alcohol, n-hexyl alcohol, sec-hexyl alcohol, etc. Other glycols are also contemplated. The alcohol concentration ranges from 5 to about 30 percent by weight of the surfactant concentrate with a preferred amount of about 20 percent, while the glycol concentration ranges from about 0 to about 10 percent by weight with a preferred amount of about 5 percent.

The primary concentrated surfactant system is mixed with alkali, and in some cases aqueous polymer, diluted with water, brine or formation brine and delivered to the formation. The primary surfactant system functions to decrease the interfacial tension between the diluted injection fluid and the residual oil in the formation allowing the injected fluids, containing the alkali, to penetrate into the microporous structure of the formation and ultimately make contact with the trapped oil. The alkali in the injection fluid, once in contact with the residual reservoir oil, reacts with the naturally occurring acidic organic components of the residual oil, forming their respective salts which exhibit surfactant properties. The resulting in situ formation of the secondary surfactants enables the oil to be emulsified and dispersed within the injection fluid.

It is important to obtain a primary surfactant formulation which provides ultra-low interfacial tensions ($<10^{-2}$ mN/m) over a broad range of alkali (such as sodium hydroxide or sodium carbonate) concentrations. Alkali will be slowly depleted by the in situ reaction, resulting in constant concentration changes. The alkali concentration is also changed by dilution effects with reservoir brine, and by adsorption on the formation. Consequently, the primary surfactant system must be stable in a broad range of alkali concentrations, furthermore the interfacial tension measurements must also remain ultra-low over the same broad range of alkali concentrations. Examples 3, 4, 6 and 7 in Table 1 are examples of concentrated surfactant formulations which have been found to meet the above criteria for lowering the interfacial tension between an alkaline brine solution and crude oil. Table 3 illustrates the ultra-low interfacial tensions measured over a range of alkali concentrations (in this case NaOH) ranging from 0.6 percent to 1.4 percent by weight using the above Examples described in Table 1. Table 3 shows that a primary concentrated surfactant system composed of a sulfonated alkylbenzene wherein only linear alkyl groups are present (Example 1) and the average molecular weight is 230, or a sulfonated alkylbenzene wherein the alkyl group is branched with an average molecular weight of 230 (Example 2), does not provide the preferred ultra-low interfacial tension values. Surprisingly, as illustrated in Table 3, a mixture of linear and branched alkylbenzene sulfonate where the alkyl chain has between about 9 and about 16 carbon atoms and the alkylbenzenes have average molecular weights of about 420 and 230 respectively (Example 3) provides ultra-low interfacial tensions in the presence of a broad concentration range of the alkali. This has also been found to be true for a mixture of linear and branched alkylbenzene sulfonate where the alkyl chain has between about 9 and about 16 carbon atoms and the alkylbenzenes have average molecular weights of about 230 and 420 respectively (Example 6). Also this has been found to be true for a mixture of branched alkylbenzene sulfonates where the alkyl chain has between about 9 and about 16 carbon atoms and the alkylbenzenes have average molecular weights of about 230 and 420 (Example 7). Finally this has also been found to be true for a mixture of linear and branched alkylbenzene sulfonate where the alkyl chain has between about 9 and about 16 carbon atoms and the alkylbenzenes have average molecular weights of about 420 and 230 respectively to which the nonionic surfactant nonylphenol+6EO has been added. (Example 4). In general it has been found that mixtures of two branched alkylaromatic sulfonates or a mixture of branched and a linear alkylaromatic sulfonates, each member of the pair having widely different molecular weights gives lower interfacial tensions than a mixture on two linear alkylaromatics having the same widely differing molecular weights. The latter still gives ultra-low interfacial tensions but the effective range of alkali or surfactant concentration for which the interfacial tensions are ultra-low is narrower. It has also been found that addition of a nonionic surfactant or the sulfonate or carboxylate of a nonionic surfactant can broaden the effective range for which ultra-low interfacial tensions are obtained.

During the preparation of diluted injection solutions in addition to the primary surfactant concentrate and the alkali, polymer may be added at a concentration of about 200 ppm to about 1% depending on the reservoir conditions, with a preferred amount of about 1000 ppm in the injection fluid. The polymer must also be compatible with the alkali, the brine and the surfactant. It has been found that polyacrylamide is the preferred polymer.

It is contemplated that a primary concentrated surfactant solution will be formulated and shipped to the field where the concentrate is diluted with water, brine or formation brine, alkali and optionally polymer before injecting downhole.

TABLE 1

| EXAMPLE | 1 | 2 | 3 | 4 | 5 | 6 | 7 |
|---|---|---|---|---|---|---|---|
| | % BY WEIGHT | | | | | | |
| LAB MW~230* | 50 | | | | | 25 | |
| LAB MW~420 | | | 25 | 25 | | 25 | |
| BAB MW~230** | | 50 | 25 | 25 | | | 25 |
| BAB MW~420 | | | | | | | 25 |
| SOLVENT(S) | 41 | 41 | 41 | 38 | | 41 | 41 |
| NaOH | 9 | 9 | 9 | 9 | | 9 | 9 |
| NONYLPHENOL + 6EO | | | | 3 | 100 | | |

*LAB = Linear Alkyl Benzene
**BAB = Branched Alkyl Benzene

TABLE 2

| SYNTHETIC BRINE SOLUTION | |
|---|---|
| $CO_3$ | 375.13 mg/L |
| $HCO_3$ | 1342.44 mg/L |
| Cl | 691.47 mg/L |
| $SO_4$ | 4.8 mg/L |
| Ca | 16.03 mg/L |
| Mg | 7.3 mg/L |
| Na | 1212.1 mg/L |

TABLE 3

| EXAMPLE | 1, 2 | 3, 4, 7 | 6 | 5 |
|---|---|---|---|---|
| CAUSTIC, % | IFT, mN/m | | | |
| 0.6 | >1 | $<10^{-2}$ | $<10^{-2}$ | >1 |
| 0.8 | >1 | $<10^{-3}$ | $<10^{-3}$ | >1 |
| 1.0 | >1 | $<10^{-3}$ | $<10^{-3}$ | >1 |
| 1.2 | >1 | $<10^{-3}$ | $<10^{-3}$ | >1 |
| 1.4 | >1 | $<10^{-3}$ | $<10^{-2}$ | >1 |

Example 1: Sulfonated Linear Alkylbenzene (alkyl chain C10–C16, Avg. MW = 420)
Example 2: Sulfonated Branched Alkylbenzene (alkyl chain C9–C15, Avg. MW = 230)
Example 3: Sulfonated Linear/Branched Alkylbenzene Blend (alkyl chain C9–C16, Avg. MW = 230/420)
Example 4: Sulfonated Linear/Branched Alkylbenzene Blend (alkyl chain C9–C16, Avg. MW = 230/420) and Nonylphenol + 6EO TABLE 3-continued

| | |
|---|---|
| Example 5: | Nonylphenol + 6EO |
| Example 6: | Sulfonated Linear Alkylbenzene (alkyl chain C9 C16, Avg. MW = 230/420) |
| Example 7: | Sulfonated Branched Alkylbenzene Blend (alkyl Chain C9–C15, Avg. MW = 230/420) |

Note:
C9–C16 Linear or Branched MW = 420 cannot be used alone to give stable formulation

We claim:

1. A composition for enhanced oil recovery comprising a primary concentrated aqueous surfactant formulation which is added to an alkali and is diluted with brine, forming a diluted primary injection solution resulting in a primary surfactant concentration, at, or below its critical micellar concentration which is introduced into a subterranean oil reservoir, wherein said reservoir oil contains naturally occurring acidic organic components, and further wherein said diluted primary injected solution provides ultra-low interfacial tension between the residual oil and the primary injection solution allowing the alkali to permeate the microscopic of the reservoir and contact and react with said naturally occurring acidic organic component(s) forming a secondary in situ formed secondary surfactant system comprising salts with surfactant properties which combines with the diluted primary injection solution, thereby enabling the trapped residual oil to be emulsified, mobilized and brought to the surface, the primary concentrated aqueous surfactant formulation, comprising:

a) from about 40 to about 60% by weight alkylaromatic sulfonic acid, wherein the alkyl group being linear or branched groups with carbon atoms numbering from about 4 to about 24, and wherein the aromatic group comprises benzene, naphthalene, toluene or xylene and further said alkylaromatic sulfonic acid having an average molecular weight of about 230 to about 600, b) from about 5 to about 30% by weight of a lower alkyl alcohol having from about 2 to about 8 carbon atoms, c) from about 0 to about 10% by weight nonionic surfactant, or sulfonated and carboxylated nonionic surfactants, d) from about 0 to about 10% by weight narrow-cut aromatic solvent, e) from about 0 to about 10% by weight alkylene glycol, f) from about 3 to about 10% strong base by weight, and g) water to balance.

2. The composition as set forth in claim 1 wherein said alkylaromatic sulfonic acid further comprises a mixture of the mono, di, or trivalent salts of the acids resulting from the sulfonation of branched and linear alkylaromatic where the alkyl chain(s) ranges from about C-4 and C-24.

3. The composition as set forth in claim 1 wherein said lower alkyl alcohol is isopropyl alcohol.

4. The composition as set forth in claim 1 wherein said alkylene glycol is ethylene glycol.

5. The composition as set forth in claim 1 wherein said nonionic surfactant is a member selected from a group consisting of the ethoxylates of nonylphenol, dinonylphenol, octylphenol, and various straight and branched chain alcohols having a carbon chain length from 8 to 20 or more carbons, wherein the ethoxylates range from about 2 to about 12 moles of ethylene oxide.

6. The composition as set forth in claim 1 wherein said nonionic surfactant is a ethoxylate of nonylphenol having from 4 to 8 moles of ethylene oxide.

7. The composition as set forth in claim 1 wherein said alkali is sodium hydroxide.

8. The composition as set forth in claim 1 wherein the alkylaromatic is alkylbenzene.

9. The composition as set forth in claim 1 wherein the carbon number of the alkyl group(s), on the branched alkylaromatic ranges from about 9 to about 15.

10. The composition as set forth in claim 1 wherein the carbon number of the alkyl group(s), on the linear alkylaromatic ranges from about 10 to about 16.

11. In the process for enhanced oil recovery wherein a primary concentrated aqueous surfactant formulation is diluted with brine, and alkali, and optionally polymer, forming a diluted primary injection solution resulting in a primary surfactant concentration, at, or below its critical micellar concentration which is introduced into a subterranean oil reservoir, wherein said reservoir oil residual oil contains naturally occurring acidic organic component(s), and further wherein said diluted primary injected solution provides ultra-low interfacial tension between the residual oil and the diluted primary injection injected solution enabling the alkali to permeate the pores of the reservoir, contact and react with said naturally occurring acidic organic component(s) forming an in situ secondary surfactant system comprising salts with surfactant properties which combines with the diluted primary injection solution, thereby enabling the trapped residual oil to be emulsified, mobilized and brought to the surface, the process utilizing a primary concentrated aqueous surfactant formulation, comprising;

a) from about 40 to about 60% by weight alkylaromatic sulfonic acid, wherein the alkyl group being linear or branched groups with carbon atom numbering from about 4 to about 24, and wherein the aromatic group comprises benzene, napthelene, toluene or xylene and further said alkylaromatic sulfonic acid having an average molecule weight of about 230 to about 600, b) from about 5 to about 30% by weight of a lower alkyl alcohol having from about 2 to about 8 carbon atoms, c) from about 0 to about 10% by weight nonionic surfactant, or sulfonated and carboxylated nonionic surfactants, d) from about 0 to about 10 percent by weight narrow-cut aromatic solvent, e) from about 0 to about 7% by weight alkylene glycol, f) from about 3 to about 10% by weight strong base, and g) water to balance.

12. The process as set forth in claim 11 wherein said primary concentrated aqueous surfactant formulation is diluted with water or brine or formation brine and alkali prior to being injected downhole, to a primary concentrated aqueous surfactant formulation concentration of between about 0.01% and about 1.0% by weight, and an alkali concentration of between about 0.1% and about 3% by weight.

13. The process as set forth in claim 11 wherein said primary concentrated aqueous surfactant formulation comprises a mixture of the mono, di, or trivalent salts of the acids resulting from the sulfonation of a mixture of branched and linear alkylaromatic and where the alkyl chain(s) ranges from about C-4 to about C-24.

14. The process as set forth in claim 11 wherein said alkyl alcohol is isopropyl alcohol.

15. The process as set forth in claim 11 wherein said alkylene glycol is ethylene glycol.

16. The process as set forth in claim 11 wherein said nonionic surfactant is a member selected from a group consisting of the ethoxylates of nonylphenol, dinonylphenol, octylphenol, and various straight and branched chain alcohols having a carbon chain lengths from 8 to 20 or more carbons, wherein the ethoxylates range from 2 to 12 moles of ethylene oxide their carboxylates and sulfates.

17. The process as set forth in claim 11 wherein said nonionic surfactant is a ethoxylate of nonylphenol having from about 4 to about 8 moles of ethylene oxide.

18. The process as set forth in claim 11 wherein said strong base is sodium hydroxide.

19. The process as set forth in claim 11 wherein said primary concentrated aqueous surfactant formulation further comprises the step; diluting the primary concentrated surfactant formulation, prior to being injected downhole, with water, brine or formation brine, alkali and polymer resulting in a polymer concentration of between about 200 ppm and about 1% by weight polymer.

20. The process as set forth in claim 19 wherein the polymer is polyacrylamide.

21. The process as set forth in claim 11 wherein the interfacial tension between the diluted primary injected solution and the reservoir oil is ultra-low ($<10^{-2}$ mN/m).

22. The process as set forth in claim 11 wherein the interfacial tension between the reservoir oil and the diluted primary injected solution is ultra-low ($<10^{-2}$ m/Nm) while the sodium hydroxide concentration ranges between about 0.1 and about 3.0 percent by weight of the injected solution.

23. The process as set forth in claim 11 wherein the interfacial tension between the reservoir oil and the injected diluted primary solution is ultra-low ($<10^{-2}$ mN/m) while the nonionic surfactant concentration is zero.

24. The process as set forth in claim 11 wherein the alkylaromatic is alkylbenzene.

25. The process as set forth in claim 11 wherein the carbon number of the alkyl group(s), on the branched alkylaromatic ranges from about 9 to about 15.

26. The process as set forth in claim 11 wherein the carbon number of the alkyl group(s), on the linear alkylaromatic ranges from about 10 to about 16.

* * * * *